US011036749B2

(12) United States Patent
Xue

(10) Patent No.: US 11,036,749 B2
(45) Date of Patent: Jun. 15, 2021

(54) QUERY-BASED DETERMINATION OF DATA VISUALIZATION

(71) Applicant: Business Objects Software Limited, Dublin (IE)

(72) Inventor: Xiaohui Xue, Courbevoie (FR)

(73) Assignee: BUSINESS OBJECTS SOFTWARE LIMITED, Dublin (IE)

( * ) Notice: Subject to any disclaimer, the term of this patent is extended or adjusted under 35 U.S.C. 154(b) by 408 days.

(21) Appl. No.: 15/334,566

(22) Filed: Oct. 26, 2016

(65) Prior Publication Data

US 2018/0113954 A1 Apr. 26, 2018

(51) Int. Cl.
*G06F 16/00* (2019.01)
*G06F 16/248* (2019.01)

(52) U.S. Cl.
CPC ................................. *G06F 16/248* (2019.01)

(58) Field of Classification Search
CPC combination set(s) only.
See application file for complete search history.

(56) References Cited

U.S. PATENT DOCUMENTS

| 7,216,116 | B1* | 5/2007 | Nilsson | G06F 16/248 |
| 2008/0109740 | A1* | 5/2008 | Prinsen | G06F 3/0486 715/764 |
| 2009/0006318 | A1* | 1/2009 | Lehtipalo | G06F 16/248 |
| 2010/0162146 | A1* | 6/2010 | Winkler | G06Q 10/06 715/763 |
| 2013/0242326 | A1* | 9/2013 | Skvirski | G06F 16/21 358/1.13 |
| 2014/0164362 | A1* | 6/2014 | Syed | G06F 16/904 707/722 |
| 2014/0379700 | A1* | 12/2014 | Heimendinger | H04L 67/10 707/722 |
| 2015/0006518 | A1* | 1/2015 | Baumgartner | G06F 16/248 707/723 |
| 2015/0212663 | A1* | 7/2015 | Papale | G06F 16/245 715/762 |
| 2015/0278214 | A1* | 10/2015 | Anand | G06F 16/338 707/748 |
| 2015/0278315 | A1* | 10/2015 | Baumgartner | G06F 16/248 715/763 |
| 2015/0302051 | A1* | 10/2015 | Baumgartner | G06F 3/04842 707/754 |
| 2016/0124960 | A1* | 5/2016 | Moser | G06T 11/206 707/723 |
| 2016/0162165 | A1* | 6/2016 | Lingappa | G06T 11/206 715/771 |

(Continued)

*Primary Examiner* — Augustine K. Obisesan
(74) *Attorney, Agent, or Firm* — Buckley, Maschoff & Talwalkar LLC

(57) ABSTRACT

A system includes reception of a first query from a first user, identification, in response to reception of the first query, of a first plurality of data entries, each of the first plurality of data entries associating the first user, the first query and a respective visualization type with a respective counter value, determination of one of the first plurality of data entries associated with a greatest respective counter value of the counter values of the first plurality of data entries, determination of a respective visualization type of the one of the first plurality of data entries, and presentation of a visualization of the determined visualization type of a first result set corresponding to the first query.

20 Claims, 11 Drawing Sheets

(56) References Cited

U.S. PATENT DOCUMENTS

2016/0210337 A1\* 7/2016 Constandt ......... G06F 16/24575
2017/0154088 A1\* 6/2017 Sherman ............. G06F 9/45558
2017/0177201 A1\* 6/2017 Disdero ................ G06F 16/248
2017/0329818 A1\* 11/2017 Le Cam .............. G06F 16/2425

\* cited by examiner

| User | Query / Query Pattern | VizType | Counter |
|---|---|---|---|
| Paul | Sales revenue by product | bar chart | 4 |
| Paul | Sales revenue by product | table | 2 |
| Paul | Top 3 sales revenue by product | line | 2 |
| Paul | Top 3 sales revenue by product | table | 3 |
| Paul | [Sales revenue] [product] | bar chart | 4 |
| Paul | [Sales revenue] [product] | table | 5 |
| Paul | [Sales revenue] [product] | line | 2 |
| Joe | Sales quantity for France as Country | geomap | 6 |
| Joe | Sales quantity for France as Country | line | 3 |
| Joe | [Sales quantity] [country] | geomap | 6 |
| Joe | [Sales quantity] [country] | line | 3 |
| [ALL] | [Sales revenue] [product] | bar chart | 4 |
| [ALL] | [Sales revenue] [product] | table | 5 |
| [ALL] | [Sales revenue] [product] | line | 2 |
| [ALL] | [Sales quantity] | geomap | 6 |
| [ALL] | [Sales quantity] | line | 3 |

*FIG. 2*

| User | Query / Query Pattern | VizType | Counter |
|---|---|---|---|
| Paul | Sales revenue by product | bar chart | 4 |
| Paul | Sales revenue by product | table | 3 |
| Paul | Top 3 sales revenue by product | line | 2 |
| Paul | Top 3 sales revenue by product | table | 3 |
| Paul | [Sales revenue] [product] | bar chart | 4 |
| Paul | [Sales revenue] [product] | table | 5 |
| Paul | [Sales revenue] [product] | line | 2 |
| Joe | Sales quantity for France as Country | geomap | 6 |
| Joe | Sales quantity for France as Country | line | 3 |
| Joe | [Sales quantity] [country] | geomap | 6 |
| Joe | [Sales quantity] [country] | line | 3 |
| [ALL] | [Sales revenue] [product] | bar chart | 4 |
| [ALL] | [Sales revenue] [product] | table | 5 |
| [ALL] | [Sales revenue] [product] | line | 2 |
| [ALL] | [Sales quantity] | geomap | 6 |
| [ALL] | [Sales quantity] | line | 3 |

*FIG. 7*

| User | Query / Query Pattern | VizType | Counter |
|---|---|---|---|
| Paul | Sales revenue by product | bar chart | 4 |
| Paul | Sales revenue by product | table | 3 |
| Paul | Top 3 sales revenue by product | line | 2 |
| Paul | Top 3 sales revenue by product | table | 3 |
| Paul | [Sales revenue] [product] | bar chart | 4 |
| Paul | [Sales revenue] [product] | table | 6 |
| Paul | [Sales revenue] [product] | line | 2 |
| Joe | Sales quantity for France as Country | geomap | 6 |
| Joe | Sales quantity for France as Country | line | 3 |
| Joe | [Sales quantity] [country] | geomap | 6 |
| Joe | [Sales quantity] [country] | line | 3 |
| [ALL] | [Sales revenue] [product] | bar chart | 4 |
| [ALL] | [Sales revenue] [product] | table | 6 |
| [ALL] | [Sales revenue] [product] | line | 2 |
| [ALL] | [Sales quantity] | geomap | 6 |
| [ALL] | [Sales quantity] | line | 3 |

*FIG. 8*

QUERY-BASED DETERMINATION OF DATA VISUALIZATION

BACKGROUND

Enterprise software systems receive, generate, and store data related to many aspects of an enterprise. Users operate reporting tools to access such data and display the data in useful formats, such as in graphic visualizations.

Reporting tools may interact with a semantic layer defining a set of objects. Each object associates one or more physical entities (e.g., a physical database table, associated columns of one or more database tables, etc.) of one or more enterprise data sources with user-friendly names. These objects may be classified as dimensions, along which one may want to perform an analysis or report (e.g., Year, Country, Product), or measures (e.g., Sales, Profit), whose values can be determined for a given combination of dimension values.

Some conventional reporting tools receive user-submitted queries including dimensions and measures (e.g., Sales by Country), and present a visualization (e.g., bar graph, pie chart, geomap) of a corresponding result set. Users have individual preferences for viewing different types of result sets. It would be beneficial to determine a visualization of a result set which is preferred by the user to whom the visualization will be presented.

BRIEF DESCRIPTION OF THE DRAWINGS

FIG. 2 is a tabular representation of data according to some embodiments.

FIG. 7 is a tabular representation of data according to some embodiments.

FIG. 8 is a tabular representation of data according to some embodiments.

DETAILED DESCRIPTION

The following description is provided to enable any person in the art to make and use the described embodiments. Various modifications, however, will remain readily apparent to those in the art.

Generally, some embodiments provide efficient determination of a visualization to present to a user. Some embodiments may store information specifying the visualizations selected by users for given queries or query patterns. The stored information is used to determine a visualization to present based on a received query and the user from whom the query was received.

Figure 1:
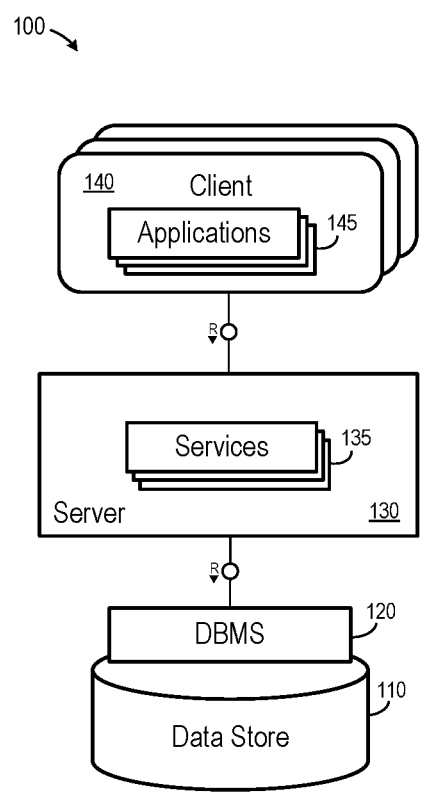
FIG. 1 is a block diagram of a system architecture according to some embodiments.

FIG. 1 is a block diagram of architecture 100 according to some embodiments. Embodiments are not limited to architecture 100 or to a database architecture.

Architecture 100 includes data store 110, database management system (DBMS) 120, server 130, services 135, clients 140 and applications 145. Generally, services 135 executing within server 130 receive requests from applications 145 executing on clients 140 and provides results to applications 145 based on data stored within data store 110.

More specifically, server 130 may execute and provide services 135 to applications 145. Services 135 may comprise server-side executable program code (e.g., compiled code, scripts, etc.) which provide functionality to applications 145 by providing user interfaces to clients 140, receiving requests from applications 145, retrieving data from data store 110 based on the requests, processing the data received from data store 110, and providing the processed data to applications 145. Services 135 may be made available for execution by server 130 via registration and/or other procedures which are known in the art.

In one specific example, a client 140 executes an application 145 to present a user interface to a user on a display of the client 140. The user enters a query into the user interface consisting of one or more dimensions and/or one or more measures. The query may also include other information such as filters. The application passes a request based on the query to one of services 135. An SQL script is generated based on the request and forwarded to DBMS 120. DBMS 120 executes the SQL script to return a result set based on data of data store 110, and the application 145 creates a report/visualization based on the result set.

Server 130 provides any suitable protocol interfaces through which applications 145 executing on clients 140 may communicate with services 135 executing on application server 130. For example, server 130 may include a HyperText Transfer Protocol (HTTP) interface supporting a transient request/response protocol over Transmission Control Protocol (TCP), and/or a WebSocket interface supporting non-transient full-duplex communications between server 130 and any clients 140 which implement the WebSocket protocol over a single TCP connection.

One or more services 135 executing on server 130 may communicate with DBMS 120 using database management interfaces such as, but not limited to, Open Database Connectivity (ODBC) and Java Database Connectivity (JDBC) interfaces. These types of services 135 may use Structured Query Language (SQL) to manage and query data stored in data store 110.

DBMS 120 serves requests to query, retrieve, create, modify (update), and/or delete data of data store 110, and also performs administrative and management functions. Such functions may include snapshot and backup management, indexing, optimization, garbage collection, and/or any other database functions that are or become known. DBMS 120 may also provide application logic, such as database procedures and/or calculations, according to some embodiments. This application logic may comprise scripts, functional libraries and/or compiled program code.

Server 130 may be separated from or closely integrated with DBMS 120. A closely-integrated server 130 may enable execution of services 135 completely on the database platform, without the need for an additional server. For example, according to some embodiments, server 130 provides a comprehensive set of embedded services which provide end-to-end support for Web-based applications. The services may include a lightweight web server, configurable support for Open Data Protocol, server-side JavaScript execution and access to SQL and SQLScript.

Server 130 may provide application services (e.g., via functional libraries) using which services 135 may manage and query the data of data store 110. The application services can be used to expose the database data model, with its tables, views and database procedures, to clients. In addition to exposing the data model, server 130 may host system services such as a search service.

Data store 110 may comprise any query-responsive data source or sources that are or become known, including but not limited to a structured-query language (SQL) relational database management system. Data store 110 may comprise a relational database, a multi-dimensional database, an eXtendable Markup Language (XML) document, or any other data storage system storing structured and/or unstructured data. The data of data store 110 may be distributed among several relational databases, dimensional databases, and/or other data sources. Embodiments are not limited to any number or types of data sources.

In some embodiments, the data of data store 110 may comprise one or more of conventional tabular data, row-based data, column-based data, and object-based data. Moreover, the data may be indexed and/or selectively replicated in an index to allow fast searching and retrieval thereof. Data store 110 may support multi-tenancy to separately support multiple unrelated clients by providing multiple logical database systems which are programmatically isolated from one another.

Data store 110 may implement an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

As described above, system 100 includes metadata defining objects which are mapped to logical entities of data store 110. The metadata be stored in data store 110 and/or a separate repository (not shown). The metadata may include information regarding dimension names (e.g., Country, Year, Product), dimension hierarchies (e.g., Country>State>City), measure names (Profit, Units, Sales) and any other suitable metadata.

According to some embodiments, and as will be described in detail below, the metadata includes information associating users, queries, query patterns and visualizations. The information may be collected during operation of system 100 and may be used to determine a visualization to present in response to a received query, and based on the query and the user from whom the query was received.

Each of clients 140 may comprise one or more devices executing program code of an application 145 for presenting user interfaces to allow interaction with application server 130. The user interfaces of applications 145 may comprise user interfaces suited for reporting, data analysis, and/or any other functions based on the data of data store 110.

Presentation of a user interface as described herein may comprise any system to render visualizations. For example, a client 140 may execute a Web Browser to request and receive a Web page (e.g., in HTML format) from application server 130 via HTTP, HTTPS, and/or WebSocket, and may render and present the Web page according to known protocols. One or more of clients 140 may also or alternatively present user interfaces by executing a standalone executable file (e.g., an .exe file) or code (e.g., a JAVA applet) within a virtual machine. In another method, one of more of clients 140 execute applications 145 loaded from server 130, that receive data and metadata by requests to services 135 executed on the server 130. Data and metadata is processed by the applications 145 to render the user interface on the client 140.

FIG. 2 is a tabular representation of data 200 according to some embodiments. As will be described in detail below, data 200 may be used to determine a visualization to present to a user based on a query received from the user. The rows (i.e., entries) of data 200 may be created and updated during operation of system 100 in response to user selection of visualizations. Embodiments are not limited to the structure and content of data 200.

Each entry of data 200 associates a user with a query or query pattern, a visualization type and a counter. According to some embodiments, the value of the counter column for an entry of data 200 indicates a number of times that the associated visualization was selected by the associated user to visualize the results of a query which matched the associated query or query pattern. A query may be any combination of measures, dimensions, and dimension values, and may include filters (e.g., Top 3, >500, etc.). As shown, the measures and dimensions of a query pattern are represented in brackets.

As will be described below, selection of a visualization for a query may result in incrementing a counter of an entry associated with the user and the query. As shown, Paul has selected a bar chart visualization four times to view results of the query "Sales revenue by product", and has selected a table visualization twice to view the results of the query "Sales revenue by product". However, to view results of the query "Top 3 sales revenue by product", Paul has selected a table visualization three times and a line chart visualization twice. Joe, on the other hand, has selected a geomap visualization six times to view results of the query "Sales quantity for France as Country" and has selected a line chart visualization three times to view the results of the same query.

Selection of a visualization for a query may also result in incrementing a counter of an entry associated with the user and a query pattern of the query. Both of Paul's above-described queries conform to the query pattern [Sales revenue] [product], therefore his selections also increment counters associated with the query pattern [Sales revenue] [product]. Specifically, data 200 reflects selection of a bar chart visualization four times for the query pattern [Sales revenue] [product], selection of a table visualization five times for the query pattern [Sales revenue] [product] (i.e., twice for the query "Sales revenue by product" and three times for the query "Top 3 sales revenue by product"), and selection of a line chart visualization twice for the query pattern [Sales revenue] [product]. Similarly, data 200 reflects Joe's selection of a geomap visualization six times for the query pattern [Sales quantity] [country], and selection of a line chart visualization three times for the query pattern [Sales quantity] [country].

Moreover, selection of a visualization for a query may also result in incrementing a counter of an entry associated with all users and the query pattern of the query. Each of the above-described selections associated with a query pattern is reflected in the entries of data 200 associated with [ALL] users. It should be noted that the counters of entries associated with [ALL] users may be incremented based on the selections of more than one user. For example, the entry of data 200 of FIG. 2 associated with [ALL] users, the query pattern [Sales revenue][product] and a bar chart visualization includes a counter value reflecting only selections made by Paul. However, this counter value will be incremented by 1 if Joe enters the query "Sales revenue for Shoes as Product" and selects a bar chart visualization. As will be described below, such an entry and selection would also result in creation of entries associated with Joe and the query and with Joe and the query pattern (i.e., [Sales revenue][product]) of the query.

Figure 3:
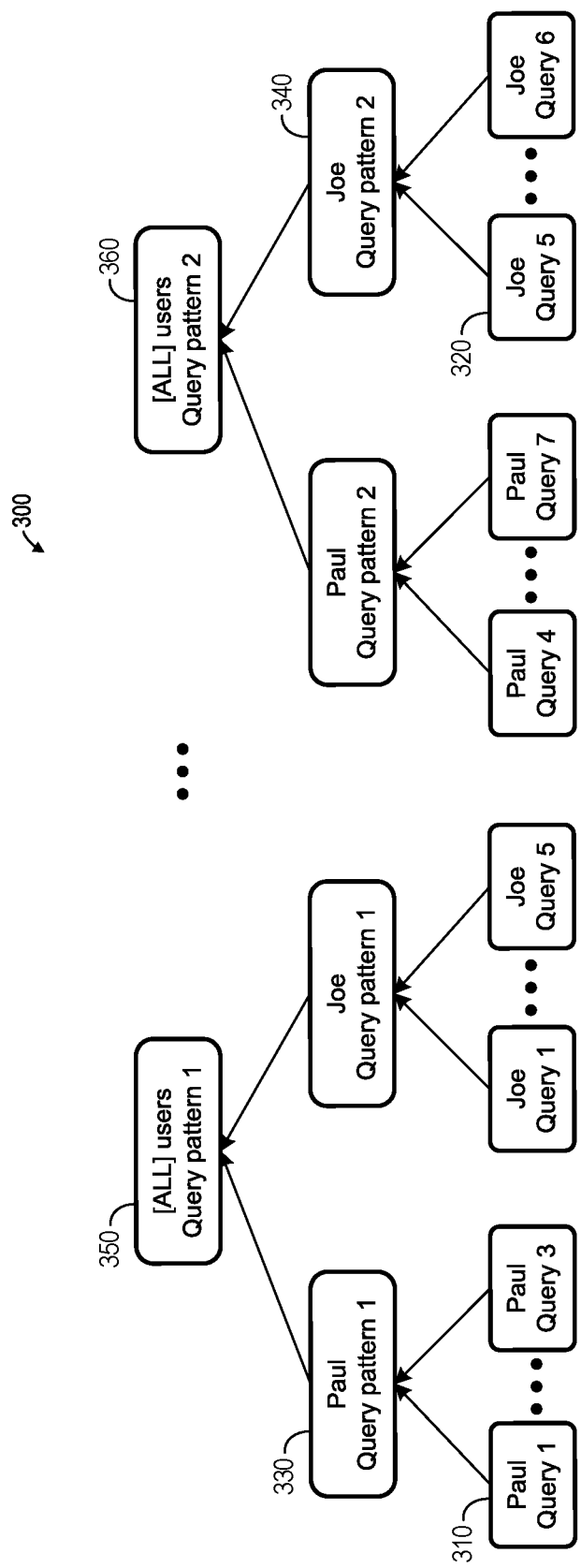
FIG. 3 illustrates a hierarchy according to some embodiments.

FIG. 3 illustrates hierarchy 300 of user/query nodes, user/query pattern nodes, and all users/query pattern nodes according to some embodiments. Hierarchy 300 is a logical framework based on which data 200 may be populated as described below with respect to process 400, and based on which a visualization to present may be determined as described with respect to process 900. Population of data 200 may involve traversing hierarchy 300 from the lowest level to the highest level and incrementing counters associated with the traversed nodes. Determination of a visualization may also include traversing hierarchy 300 from the lowest level to the highest level until a matching node is found.

Each node of hierarchy 300 represents one or more visualizations and associated counters. The lowest level of nodes defines counters for each visualization associated with a user and a query. For example, node 310 may represent the first two entries of data 200 of FIG. 2. Similarly, node 320 may represent the eighth and ninth entries of data 200. The middle level of nodes defines counters for each visualization associated with a user and a query pattern. The query pattern of a middle-level node is a pattern to which the queries of each of its child nodes conforms (e.g., the query of node 310 conforms to the query pattern of node 330, and the query of node 320 conforms to the query pattern of node 340). Continuing the example, node 330 may represent the fifth through seventh entries of data 200 and node 340 may represent the tenth and eleventh entries of data 200.

Figure 4A:
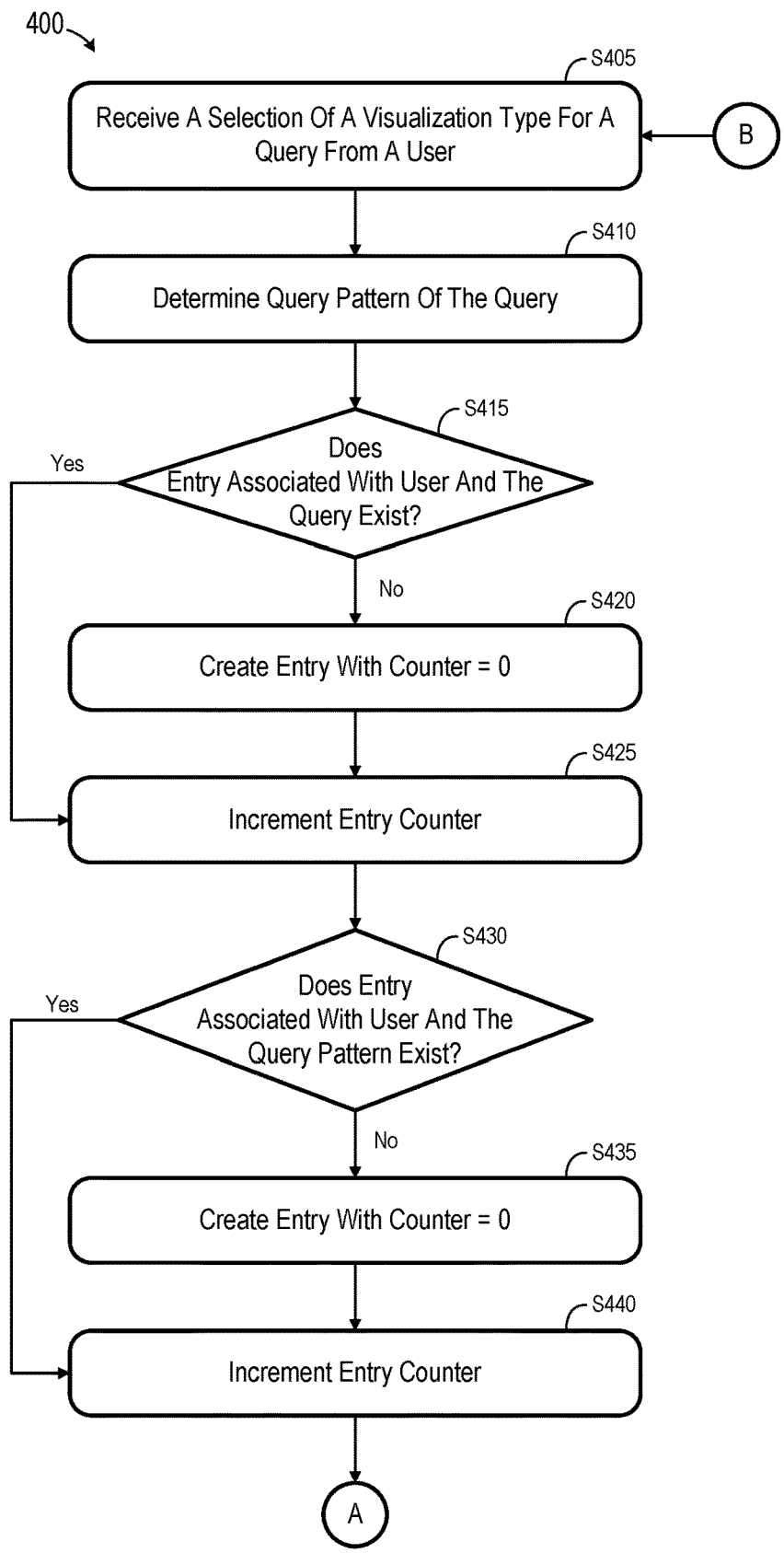
FIGS. 4A and 4B comprise a flow diagram of a process according to some embodiments.
Figure 4B:
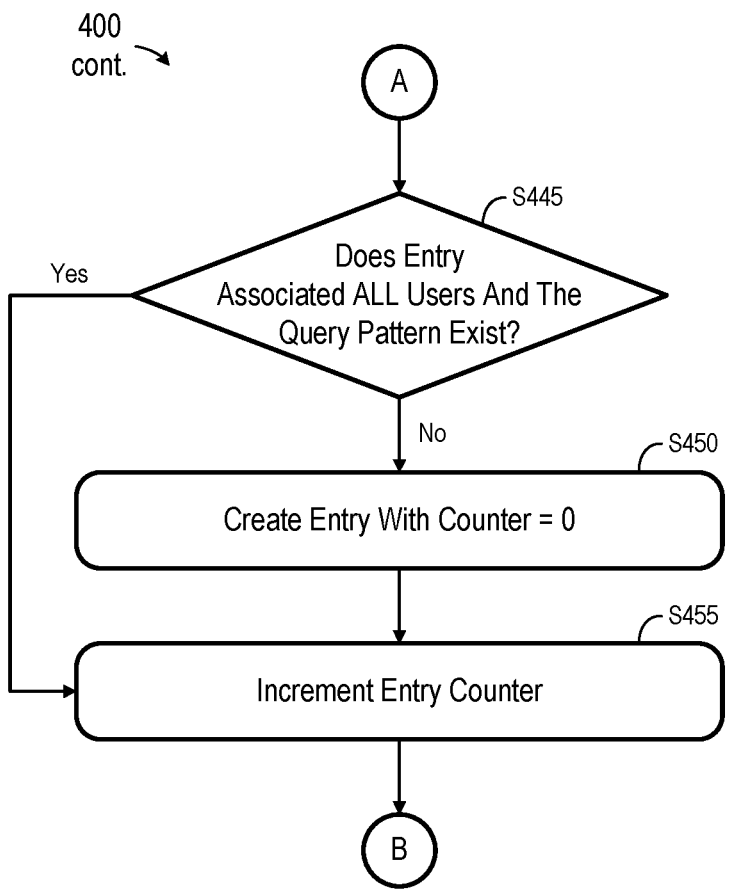

Each of the highest level of nodes defines counters for all visualizations associated with a respective query pattern. The last five entries of data 200 correspond to nodes at the highest level of hierarchy 200. For example, node 350 corresponds to the twelfth through fourteenth entries and node 360 corresponds to the fifteenth and sixteenth entries FIGS. 4A and 4B comprise a flow diagram of process 400 according to some embodiments. Process 400 may be executed to populate a data structure for use in determining a visualization to present to a user based on a received query.

In some embodiments, various hardware elements of system 100 execute program code to perform process 400. Process 400 and all other processes mentioned herein may be embodied in computer-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Figure 5:
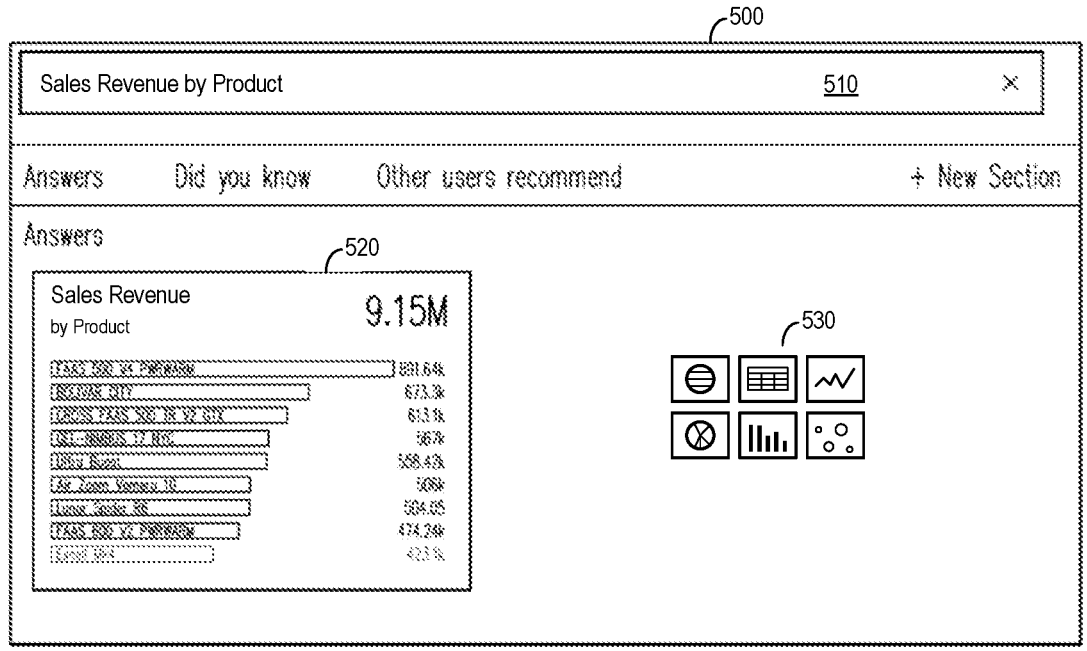
FIG. 5 is an outward view of a displayed user interface according to some embodiments.

Prior to process 400, a user submits a query in order to request a result set of data. The query may comprise at least one measure or dimension. FIG. 5 illustrates interface 300 to receive a query from a user according to some embodiments. Interface 500 may comprise a Web page provided by server 130 in response to a request from a Web browser application 145 executing on client 140. Any client application 145 may be used to display interface 500, which is not limited to Web-based formats.

As shown, a user has entered the query "Sales Revenue by product" into input field 510. As described above, and according to some embodiments, server 130 may receive the query, generate an SQL script based on the query and on the metadata defining the dimensions and measures of the query, and forward the script to DBMS 120. DBMS 120 executes the SQL script to return a corresponding result set to an application 145 based on data of data store 110, and the application 145 creates visualization 520 based on the result set.

The determination to display visualization 520 will be described below with respect to process 900. Visualization 520 comprises a bar graph showing sales revenue for each of several products. Visualization 520 may be generated using any suitable system for producing a visualization of a result set of data based on a query.

Figure 6:
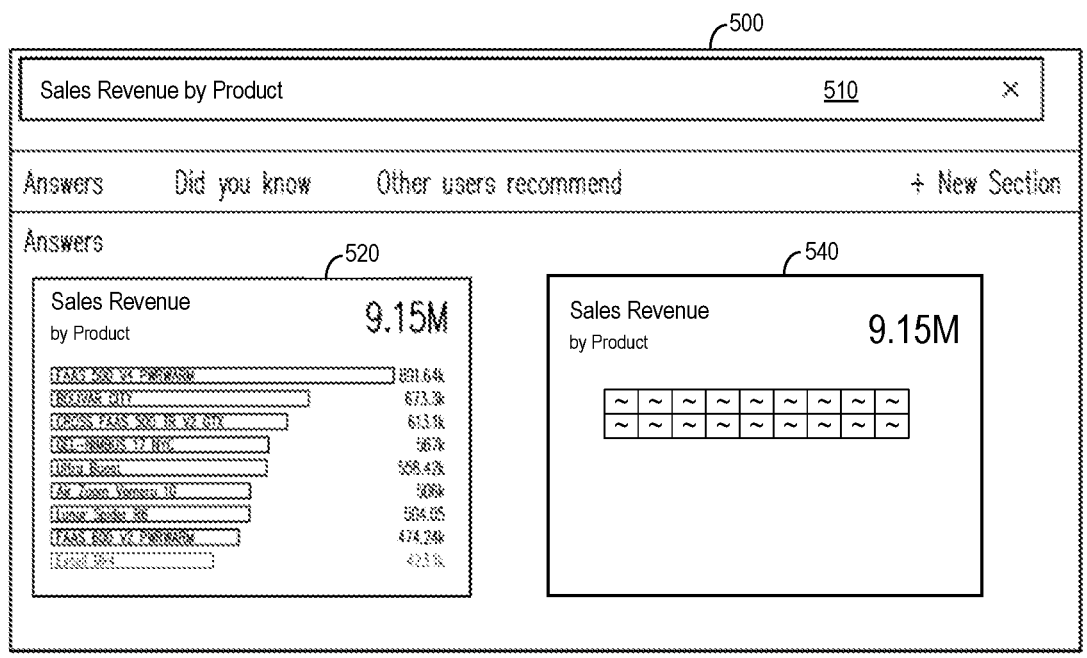
FIG. 6 is an outward view of a displayed user interface according to some embodiments.
Figure 9:
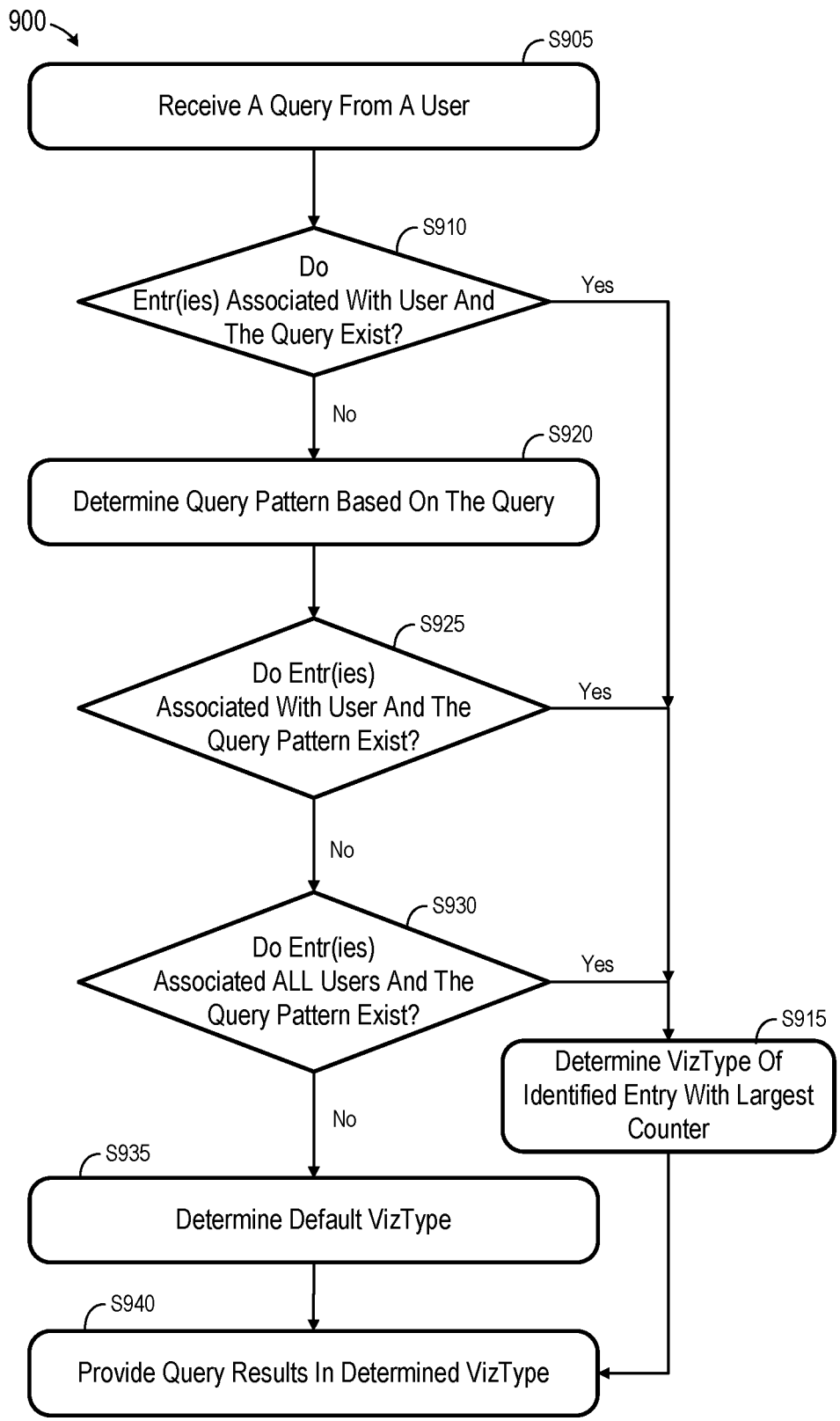
FIG. 9 comprises a flow diagram of a process according to some embodiments.

Interface 500 also includes icons 530 for selecting other types of visualizations for displaying the result set. Icons 530 are selectable to select a geomap, a table, a line chart, a pie chart, a bar chart or a scatter plot. Embodiments may support any types of visualizations that are or become known. According to some embodiments, icons 530 may include only those visualizations which are compatible with the received query. It will be assumed that the user selects an icon 530 associated with a table visualization type. In response, the result set is displayed as table visualization 540 of FIG. 6

The selection of the table visualization type is received at S405. A query pattern of the query is determined at S410. The query pattern of a query may comprise any representation of the query. The pattern may describe the query as well as one or more other queries. In some embodiments, filters are ignored and specific measures or dimensions of a query are represented as [measure] or [dimension], respectively, in the pattern of the query. With respect to the current example, query the pattern of the query "Sales Revenue by Product" may be determined as [Sales Revenue] [Product] according to some embodiments.

Next, at S415, it is determined whether an entry associated with the user, the received query and the selected visualization type exists. In the present example, it will be assumed that Paul is the user from whom the query was received. The second entry of data 200 of FIG. 2 includes Paul, "Sales Revenue by product" and table, therefore the determination at S415 is affirmative. Flow therefore proceeds to S425 to increment the counter value of the entry to three, as shown in FIG. 7. If no entry existed corresponding to Paul, "Sales Revenue by product" and table, then such an entry would have been created at S420 with a counter value of zero, and this counter value would have been incremented to one at S425.

Continuing the present example, it is determined at S430 whether an entry associated with the user, the query pattern and the selected visualization type exists. Since the sixth entry in data 200 is associated with user Paul, query pattern [Sales Revenue] [Product], and visualization type table, flow proceeds to S440 to increment the associated counter value to six, as shown in FIG. 8. Again, if no entry existed corresponding to user Paul, query pattern [Sales Revenue] [Product], and visualization type table, then such an entry would have been created at S435 with a counter value of zero, and this counter value would have been incremented to one at S440.

It is then determined at S445 whether an entry associated with all users, the query pattern and the selected visualization type exists. The thirteenth entry in data 200 is associated with all users, query pattern [Sales Revenue] [Product], and visualization type table. The associated counter value is therefore incremented to six at S455, as also shown in FIG. 8. This entry would have been created at S450 with a counter value of zero if it was determined not to exist, and the counter value would have been incremented to one at S455.

Flow returns to S405 and continues as described above to populate data 200 in response to user selection of visualization types. Process 400 may be executed by server 130 and may therefore include reception of selections at S405 from any number of users. Independent instances of process 400 may be executed by several different execution threads in parallel to support multiple simultaneous users, which may require a mechanism for sharing (e.g., locking) data 200 among the execution threads.

Process 900 may be executed to determine a visualization to present to a user based on a query received from the user and on data such as data 200. A query is received from the user at S905. Returning to the example of FIG. 5, it will again be assumed that user Paul has input the query "Sales Revenue by Product" and that the query is received at S905. At S910, it is determined whether entries exist which are associated with this user and query. FIG. 2 shows the first two entries of data 200 associated with user Paul and query "Sales Revenue by Product". Flow therefore proceeds to S915.

At S915, the identified entry with the largest counter value is determined and the visualization type of the entry is identified. In the present example, the first identified entry's counter value (i.e., 4) is greater than the second identified entry's counter value (i.e., 2) and the visualization type of the first entry is bar chart. Therefore, at S940, results of the received query are provided as a bar chart visualization, such as bar chart visualization 520 of FIG. 5.

Figure 10:
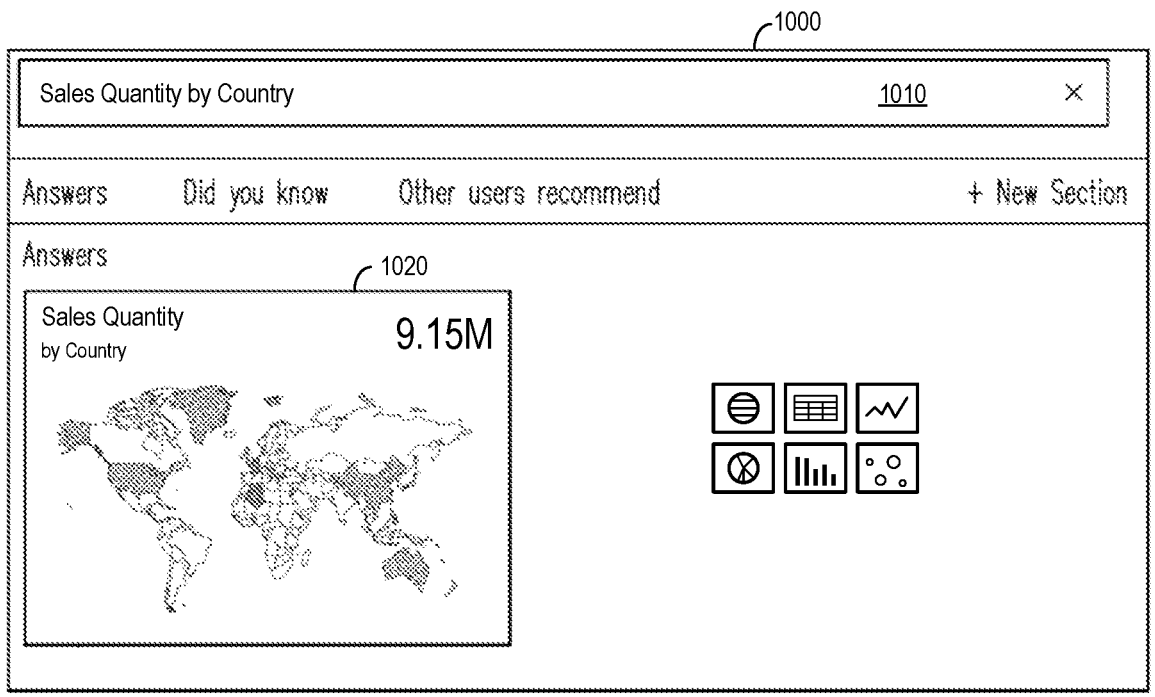
FIG. 10 is an outward view of a displayed user interface according to some embodiments

FIG. 10 illustrates another example which will be used to describe process 900. Initially, at S905, it will be assumed that user Joe has input the query "Sales Quantity by Country" into field 1010 of interface 1000. At S910, it is determined whether entries exist which are associated with this user and query. No entries of data 200 are associated with user Joe and the specific query "Sales Quantity by Country". Flow therefore proceeds to S920.

The query pattern of the received query is determined at S920. In the present example, the query pattern of the query "Sales Quantity by Country" is determined as [Sales Quantity][Country]. Next, at S925, it is determined whether any entries exist which are associated with the user and the query pattern of the received query. The tenth and eleventh entries of data 200 of FIG. 2 are determined at S925 to be associated with user Joe and query pattern [Sales Quantity][Country].

Accordingly, as described above, the identified entry with the largest counter value is determined and the visualization type of the entry is identified at S915. In the present example, the tenth entry's counter value (i.e., 6) is greater than the eleventh entry's counter value (i.e., 3) and the visualization type of the eleventh entry is geomap. Therefore, at S940, results of the received query are provided as a geomap visualization, such as geomap visualization 1020 of FIG. 10.

Figure 11:
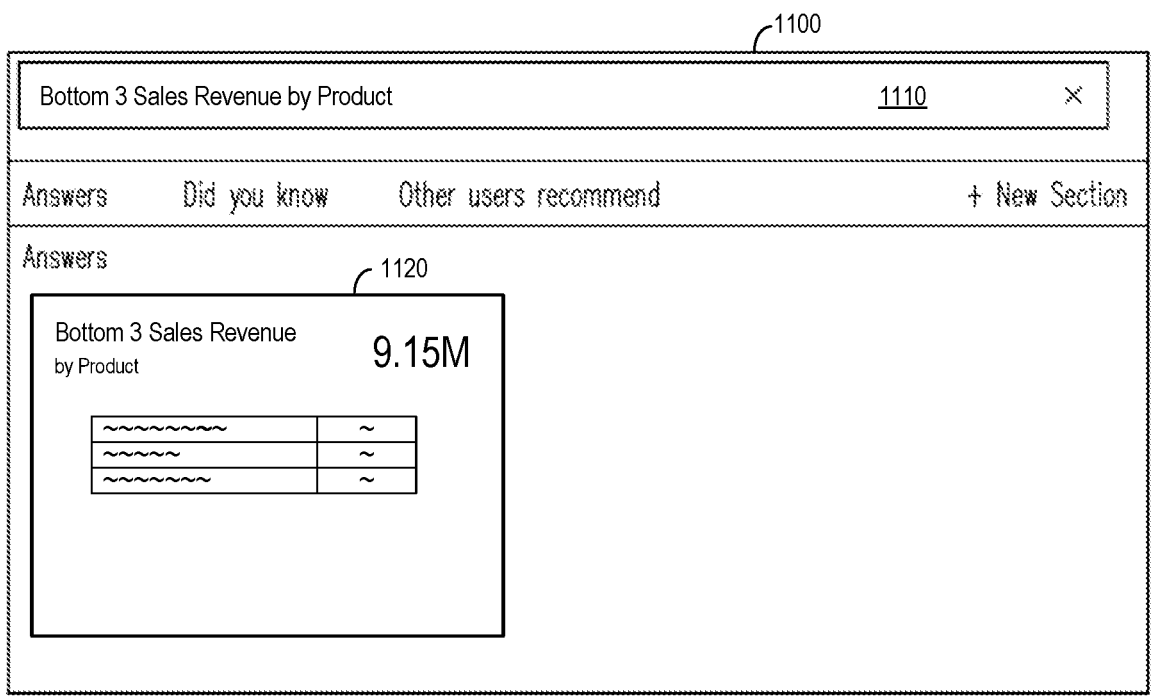
FIG. 11 is an outward view of a displayed user interface according to some embodiments.

Process 900 will now be described with respect to FIG. 11. It will be assumed that user Mary has input the query "Bottom 3 Sales Revenue by Product" into field 1110 of interface 1100. At S910, it is determined that no entries of data 200 exist which are associated with user Mary and the received query. The query pattern of the received query is determined as [Sales Revenue] [Product] at S920. Next, at S925, it is determined that no entries of data 200 exist which are associated with user Mary and the query pattern [Sales Revenue][Product].

Therefore, at S930, it is determined whether any entries of data 200 exist which are associated with all users and the query pattern [Sales Revenue][Product]. The twelfth through fourteenth entries of data 200 of FIG. 2 are associated with all users and the query pattern [Sales Revenue] [Product]. It is then determined at S915 that the thirteenth entry's counter value (i.e., 5) is the greatest of the three identified entries, and that the visualization type of the thirteenth entry is table. Therefore, at S940, results of the received query are provided as a table visualization, such as table visualization 1120 of FIG. 11. According to some embodiments, visualization selections of one user may therefore affect not only the visualizations displayed to that user but also to other users.

If the determination at S930 is negative, flow proceeds to S940 to determine a default visualization type. Different types of visualizations may be designated as default visualizations for certain types of queries. In one example, a bar graph may be designated as a default visualization for displaying a result set of a query including a "<measure> by <dimension>" clause. In another example, a geomap is a default visualization for queries including a geographical dimension.

Figure 12:
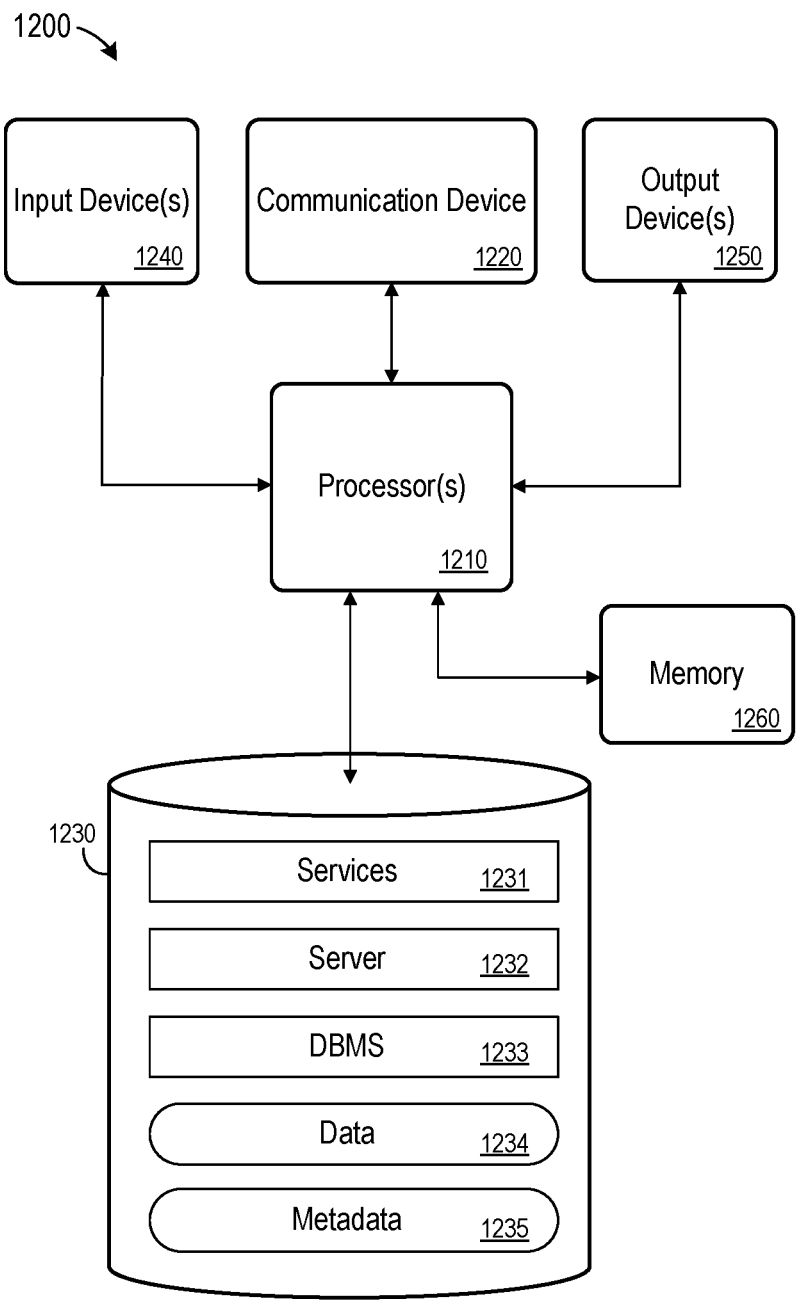
FIG. 12 is a block diagram of an apparatus according to some embodiments.

FIG. 12 is a block diagram of apparatus 1200 according to some embodiments. Apparatus 1200 may comprise a general-purpose computing apparatus and may execute program code to perform any of the functions described herein. Apparatus 1200 may comprise an implementation of server 130, DBMS 120 and data store 110 of FIG. 1 in some embodiments. Apparatus 1200 may include other unshown elements according to some embodiments.

Apparatus 1200 includes processor 1210 operatively coupled to communication device 1220, data storage device 1230, one or more input devices 1240, one or more output devices 1250 and memory 1260. Communication device 1220 may facilitate communication with external devices, such as a reporting client, or a data storage device. Input device(s) 1240 may comprise, for example, a keyboard, a keypad, a mouse or other pointing device, a microphone, knob or a switch, an infra-red (IR) port, a docking station, and/or a touch screen. Input device(s) 1240 may be used, for example, to enter information into apparatus 1200. Output device(s) 1250 may comprise, for example, a display (e.g., a display screen) a speaker, and/or a printer.

Data storage device 1230 may comprise any appropriate persistent storage device, including combinations of magnetic storage devices (e.g., magnetic tape, hard disk drives and flash memory), optical storage devices, Read Only Memory (ROM) devices, etc., while memory 1260 may comprise Random Access Memory (RAM), Storage Class Memory (SCM) or any other fast-access memory.

Services 1231, server 1232 and DBMS 1233 may comprise program code executed by processor 1210 to cause apparatus 1200 to perform any one or more of the processes described herein. Embodiments are not limited to execution of these processes by a single apparatus.

Data 1234 and metadata 1235 (either cached or a full database) may be stored in volatile memory such as memory 1260. Metadata 1235 may include information regarding dimension names, dimension hierarchies, measure names, and information such as data 200 associating users, queries/query patterns and visualization types with counter values. Data storage device 1230 may also store data and other program code for providing additional functionality and/or which are necessary for operation of apparatus 1200, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
   a memory storing processor-executable process steps; and
   a processor to execute the processor-executable process steps to cause the system to:
   increment a first counter of a first plurality of counters in response to a user selection, by a first user of a plurality of users, of a visualization type for display of information associated with the first counter and a first query, wherein the first counter is specific to the first user and the first query;
   increment a second counter of a second plurality of counters in response to the user selection, by the first user, of the visualization type, wherein the second counter indicates a query pattern for the plurality of users and the first query, the query pattern comprising at least one measure or dimension of the first query;
   receive a particular query from the first user;
   in response to reception of the particular query, determine whether the first user has previously submitted the particular query, and,
   at least partially in response to determining that the first user has previously the particular query, identify a first plurality of data entries for the particular query and specific to the first user and comprising a mapping associating the first user, the particular query and two or more respective visualization types with respective counter values of the first plurality of counters, wherein each of the respective counter values indicates a number of times for which each of the respective visualization types has previously been selected for display for the particular query by the first user, determine one of the first plurality of data entries associated with a greatest respective first counter value, and determine a respective first visualization type of the one of the first plurality of data entries corresponding to the greatest respective first counter value; and
   at least partially in response to determining that the first user has not previously submitted the particular query, identify a second plurality of data entries for a query pattern corresponding to the particular query for the plurality of users, and comprising a mapping associating the query pattern and two or more respective visualization types with respective counter values of the second plurality of counters, wherein each of the respective counter values indicates a number of times for which each of the respective visualization types has previously been selected for display for the query pattern by the plurality of users, determine one of the second plurality of data entries for the plurality of users and the query pattern associated with a greatest respective second counter value of the respective counter values of the second plurality of data entries, and determine a respective second visualization type of the one of the second plurality of data entries corresponding to the greatest respective second counter value; and
   a display to present a visualization of the determined first or second visualization type of a first result set corresponding to the particular query or to the query pattern based on the determination of whether the first user has previously submitted the particular query.

2. A system according to claim 1, wherein the respective counter value of an entry of the first plurality of counters indicates a number of selections by the first user of the visualization type of the entry for the first query.

3. A system according to claim 1, the processor to further execute the processor-executable process steps to cause the system to:
   receive a second query from the first user;
   determine a first query pattern associated with the second query;
   identify a second plurality of data entries, each of the second plurality of data entries associating the first user, the first query pattern and a respective visualization type with a respective counter value;
   determine one of the second plurality of data entries associated with a greatest respective counter value of the counter values of the second plurality of data entries; and
   determine a second respective visualization type of the one of the second plurality of data entries; and
   the display to present a visualization of the second visualization type of a second result set corresponding to the second query.

4. A system according to claim 3, the processor to further execute the processor-executable process steps to cause the system to:
   determine that no data entries associate the first user, the second query and a respective visualization type with a respective counter value.

5. A system according to claim 4, the processor to further execute the processor-executable process steps to cause the system to:

receive a third query from the first user;
determine a second query pattern associated with the third query;
identify a third plurality of data entries, each of the third plurality of data entries associating all users, the second query pattern and a respective visualization type with a respective counter value;
determine one of the third plurality of data entries associated with a greatest respective counter value of the counter values of the third plurality of data entries; and
determine a third respective visualization type of the one of the third plurality of data entries; and
the display to present a visualization of the third visualization type of a third result set corresponding to the third query.

6. A system according to claim 5, the processor to further execute the processor-executable process steps to cause the system to:
receive a fourth query from a second user;
determine a third query pattern associated with the fourth query, the third query pattern being identical to the second query pattern;
identify the third plurality of data entries associating all users, the third query pattern and a respective visualization type with a respective counter value;
determine the one of the third plurality of data entries associated with a greatest respective counter value of the counter values of the third plurality of data entries; and
determine the third respective visualization type of the one of the third plurality of data entries; and
the display to present a visualization of the third visualization type of a fourth result set corresponding to the fourth query.

7. A system according to claim 1, the processor to further execute the processor-executable process steps to cause the system to:
receive, from the first user, a selection of a visualization type to present the first result set of the first query;
determine an entry associating the user, the first query and the selected visualization type; and
increment a counter value of the entry associating the user, the first query and the selected visualization type.

8. A system according to claim 7, the processor to further execute the processor-executable process steps to cause the system to:
determine an entry associating the user, a query pattern of the first query and the selected visualization type;
increment a counter value of the entry associating the user, the query pattern of the first query and the selected visualization type;
determine an entry associating all users, the query pattern of the first query and the selected visualization type; and
increment a counter value of the entry associating all users, the query pattern of the first query and the selected visualization type.

9. A system according to claim 7, the processor to further execute the processor-executable process steps to cause the system to:
receive, from the first user, a second selection of a second visualization type to present the first result set of the first query;
determine an entry associating the user, the first query and the selected second visualization type; and
increment a counter value of the entry associating the user, the first query and the selected second visualization type.

10. A computer-implemented method comprising:
incrementing a first counter of a first plurality of counters in response to a user selection, by a first user of a plurality of users, of a visualization type for display of information associated with the first counter and a first query, wherein the first counter is specific to the first user and the first query;
incrementing a second counter of a second plurality of counters in response to the user selection, by the first user, of the visualization type, wherein the second counter indicates a query pattern for the plurality of users and the first query, the query pattern comprising at least one measure or dimension of the first query;
receiving a particular query from the first user;
in response to receiving the particular query, determining whether the first user has previously submitted the particular query and,
at least partially in response to determining that the first user has previously the particular query, identifying a first plurality of data entries for the particular query and specific to the first user and comprising a mapping associating the first user, the particular query and two or more respective visualization types with respective counter values of the first plurality of counters, wherein the respective counter values indicates a number of times for which each of the respective visualization types has previously been selected for display for the particular query by the first user, determine one of the first plurality of data entries associated with a greatest respective first counter value and determining a respective first visualization type of the one of the first plurality of data entries corresponding to the greatest respective first counter value; and
at least partially in response to determining that the first user has not previously submitted the particular query, identify a second plurality of data entries for a query pattern corresponding to the particular query for the plurality of users, and comprising a mapping associating the query pattern and two or more respective visualization types with respective counter values of the second plurality of counters, wherein each of the respective counter values indicates a number of times for which each of the respective visualization types has previously been selected for display for the query pattern by the plurality of users, determine one of the second plurality of data entries for the plurality of users and the query pattern associated with a greatest respective second counter value of the respective counter values of the second plurality of data entries, and determine a respective second visualization type of the one of the second plurality of data entries corresponding to the greatest respective second counter value; and
presenting a visualization of the determined first or second visualization type of a first result set corresponding to the particular query or to the query pattern based on the determination of whether the first user has previously submitted the particular query.

11. A method according to claim 10, wherein the respective counter value of an entry of the first plurality of counters indicates a number of selections by the first user of the visualization type of the entry for the first query.

12. A method according to claim 10, further comprising:
receiving a second query from the first user;
determining a first query pattern associated with the second query;
identifying a second plurality of data entries, each of the second plurality of data entries associating the first user, the first query pattern and a respective visualization type with a respective counter value;
determining one of the second plurality of data entries associated with a greatest respective counter value of the counter values of the second plurality of data entries;
determining a second respective visualization type of the one of the second plurality of data entries; and
presenting a visualization of the second visualization type of a second result set corresponding to the second query.

13. A method according to claim 12, further comprising:
receiving a third query from the first user;
determining a second query pattern associated with the third query;
identifying a third plurality of data entries, each of the third plurality of data entries associating all users, the second query pattern and a respective visualization type with a respective counter value;
determining one of the third plurality of data entries associated with a greatest respective counter value of the counter values of the third plurality of data entries;
determining a third respective visualization type of the one of the third plurality of data entries; and
presenting a visualization of the third visualization type of a third result set corresponding to the third query.

14. A method according to claim 13, further comprising:
receiving a fourth query from a second user;
determining a third query pattern associated with the fourth query, the third query pattern being identical to the second query pattern;
identifying the third plurality of data entries associating all users, the third query pattern and a respective visualization type with a respective counter value;
determining the one of the third plurality of data entries associated with a greatest respective counter value of the counter values of the third plurality of data entries;
determining the third respective visualization type of the one of the third plurality of data entries; and
presenting a visualization of the third visualization type of a fourth result set corresponding to the fourth query.

15. A method according to claim 10, further comprising:
receiving, from the first user, a selection of a visualization type to present the first result set of the first query;
determining an entry associating the user, the first query and the selected visualization type; and
incrementing a counter value of the entry associating the user, the first query and the selected visualization type.

16. A method according to claim 15, further comprising:
determining an entry associating the user, a query pattern of the first query and the selected visualization type;
incrementing a counter value of the entry associating the user, the query pattern of the first query and the selected visualization type;
determining an entry associating all users, the query pattern of the first query and the selected visualization type; and
incrementing a counter value of the entry associating all users, the query pattern of the first query and the selected visualization type.

17. A method according to claim 15, further comprising:
receiving, from the first user, a second selection of a second visualization type to present the first result set of the first query;
determining an entry associating the user, the first query and the selected second visualization type; and
incrementing a counter value of the entry associating the user, the first query and the selected second visualization type.

18. A non-transitory computer-readable medium storing program code, the program code executable by a processor of a computing system to cause the computing system to:
increment a first counter of a first plurality of counters in response to a user selection, by a first user of a plurality of users, of a visualization type for display of information associated with the first counter and a first query, wherein the first counter is specific to the first user and the first query;
increment a second counter of a second plurality of counters in response to the user selection, by the first user, of the visualization type, wherein the second counter indicates a query pattern for the plurality of users and the first query, the query pattern comprising at least one measure or dimension of the first query;
receive a particular query from the first user;
in response to reception of the particular query, determine whether the first user has previously submitted the particular query and,
at least partially in response to determining that the first user has previously the particular query, identify a first plurality of data entries for the particular query and specific to the first user and comprising a mapping associating the first user, the particular query and two or more respective visualization types with respective counter values of the first plurality of counters, wherein each of the respective counter values indicates a number of times for which each of the respective visualization types has previously been selected for display for the particular query by the first user, determine one of the first plurality of data entries associated with a greatest respective first counter value, and determine a respective first visualization type of the one of the first plurality of data entries corresponding to the greatest respective first counter value; and
at least partially in response to determining that the first user has not previously submitted the particular query, identify a second plurality of data entries for a query pattern corresponding to the particular query for the plurality of users, and comprising a mapping associating the query pattern and two or more respective visualization types with respective counter values of the second plurality of counters, wherein each of the respective counter values indicates a number of times for which each of the respective visualization types has previously been selected for display for the query pattern by the plurality of users, determine one of the second plurality of data entries for the plurality of users and the query pattern associated with a greatest respective second counter value of the respective counter values of the second plurality of data entries, and determine a respective second visualization type of the one of the second plurality of data entries corresponding to the greatest respective second counter value; and
present a visualization of the determined first or second visualization type of a first result set corresponding to the particular query or to the query pattern based on the determination of whether the first user has previously submitted the particular query.

19. A medium according to claim 18, the program code executable by a processor of a computing system to cause the computing system to:
   receive a second query from the first user;
   determine a first query pattern associated with the second query;
   identify a second plurality of data entries, each of the second plurality of data entries associating the first user, the first query pattern and a respective visualization type with a respective counter value;
   determine one of the second plurality of data entries associated with a greatest respective counter value of the counter values of the second plurality of data entries;
   determine a second respective visualization type of the one of the second plurality of data entries; and
   present a visualization of the second visualization type of a second result set corresponding to the second query.

20. A medium according to claim 19, the program code executable by a processor of a computing system to cause the computing system to:
   receive, from the first user, a selection of a visualization type to present the first result set of the first query;
   determine an entry associating the user, the first query and the selected visualization type;
   increment a counter value of the entry associating the user, the first query and the selected visualization type;
   determine an entry associating the user, a query pattern of the first query and the selected visualization type;
   increment a counter value of the entry associating the user, the query pattern of the first query and the selected visualization type;
   determine an entry associating all users, the query pattern of the first query and the selected visualization type; and
   increment a counter value of the entry associating all users, the query pattern of the first query and the selected visualization type.

* * * * *